US012507123B2

(12) United States Patent
Han et al.

(10) Patent No.: US 12,507,123 B2
(45) Date of Patent: Dec. 23, 2025

(54) TRAFFIC CONTROL METHOD AND ELECTRONIC APPARATUS THEREFOR

(71) Applicant: AGENCY FOR DEFENSE DEVELOPMENT, Daejeon (KR)

(72) Inventors: Myoung Hun Han, Daejeon (KR); Bong Soo Roh, Daejeon (KR); Su Il Kim, Daejeon (KR); Kil Soo Jeong, Daejeon (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 362 days.

(21) Appl. No.: 18/143,244

(22) Filed: May 4, 2023

(65) Prior Publication Data
US 2023/0362732 A1   Nov. 9, 2023

(30) Foreign Application Priority Data

May 4, 2022   (KR) .......................... 10-2022-0055694

(51) Int. Cl.
*H04W 28/02*   (2009.01)
*H04W 28/08*   (2023.01)

(52) U.S. Cl.
CPC ... *H04W 28/0967* (2020.05); *H04W 28/0925* (2020.05)

(58) Field of Classification Search
CPC ............. H04W 28/0925; H04W 28/02; H04W 28/0967; H04W 52/0261; H04W 4/02
See application file for complete search history.

(56) References Cited

U.S. PATENT DOCUMENTS

| | | | |
|---|---|---|---|
| 2002/0191573 A1 | 12/2002 | Whitehill et al. | |
| 2011/0225311 A1 | 9/2011 | Liu et al. | |
| 2017/0257129 A1* | 9/2017 | Egner | H04W 52/0261 |
| 2018/0014222 A1 | 1/2018 | Song et al. | |
| 2020/0366607 A1 | 11/2020 | Kommula et al. | |
| 2022/0386164 A1* | 12/2022 | Lee | H04W 28/0273 |

FOREIGN PATENT DOCUMENTS

| | | |
|---|---|---|
| EP | 3217598 B1 | 9/2018 |
| KR | 102202458 B1 | 1/2021 |
| KR | 20220009234 A | 1/2022 |

OTHER PUBLICATIONS

Qingming Ma, "Quality-of-Service Routing in Integrated Services Networks", Carnegie-Mellon Univ Pittsburgh PA School of Computer Science, Jan. 1, 1998.
Srihari Raghavan, "An MPLS-based Quality of Service Architecture for Heterogeneous Networks", Virginia Tech, Nov. 12, 2001.

* cited by examiner

*Primary Examiner* — Anez C Ebrahim
(74) *Attorney, Agent, or Firm* — MILES & STOCKBRIDGE P.C.

(57) ABSTRACT

Traffic control systems, devices, methods, and instructions for an electronic apparatus according to example embodiments may include identifying a traffic session based on QoS characteristics information of a transport layer, generating transmission state information of the traffic session by performing analysis on the traffic session, and generating path state information of the traffic session based on QoS requirements information of the traffic session and routing cost information of a network layer, determining whether the transmission state information and the path state information satisfy a QoS traffic policy, and performing traffic control according to a result of the determination.

17 Claims, 8 Drawing Sheets

FIG. 4

| Type | Item | Content |
|---|---|---|
| Traffic QoS characteristics (upper transport layer) | Protocol | TCP, UDP, Port |
| | Session information | message size, cycle, retransmission |
| | Session time | Long, Middle, Short |
| | Termination condition | latency, transmission success rate |
| | Session characteristic | real-time, quasi-real-time, non-real-time |
| | DSCP | EF, AF11, AF22, etc. |
| | Priority | high, medium, low |
| | Required throughput | 0 Mbps or more |
| Slice characteristics (lower network layer) | Reliability (R) | slice queue packet loss rate |
| | Promptness (P) | slice latency |
| | Stability (S) | slice path change rate |
| | Transmission capacity (C) | slice transmission capacity |

TRAFFIC CONTROL METHOD AND ELECTRONIC APPARATUS THEREFOR

PRIORITY INFORMATION

This application claims the benefit of Korean Patent Application No. 10-2022-0055694, filed on May 4, 2022, in the Korean Intellectual Property Office, the disclosure of which is incorporated herein by reference in its entirety.

FIELD OF THE INVENTION

The embodiments of the present disclosure relate to a cross-layer based traffic control method and apparatus for ensuring quality of service (QOS) of data traffic in multi-tiered heterogeneous network slices.

DESCRIPTION OF THE RELATED ART

A multi-tiered heterogeneous network environment is a network with a dynamic wireless topology composed of heterogeneous links in space, air, and ground, with frequent network rerouting and different transmission capacity and quality for each wireless link.

Existing Transmission Control Protocol (TCP)/User Datagram Protocol (UDP)-based Internet services are protocols developed over a wired, stable infrastructure, which may cause frequent retransmissions due to radio errors and network congestion. In addition, TCP/UDP-based Internet services cannot recognize end-to-end QoS satisfaction based on the QoS requirements characteristics of the data traffic, so they perform best-effort transmission regardless of whether QoS is achieved. It results in significant bandwidth waste in wireless networks and, in the case of TCP services, extends to overall network performance degradation due to retransmissions.

In order to rectify the above shortcomings, conventional wireless TCP technology (Wireless-TCP) has endeavored to control TCP parameters such as congestion control algorithms and mitigating buffer bloat to accelerate traffic and improve transmission efficiency. However, since the conventional wireless TCP technology relies on information such as hop-by-hop queue drop and SYN-ACK of relay nodes to determine the network state, it is difficult to reflect the multi-tiered heterogeneous network states where latency and packet drop characteristics are different for each link, and it is also difficult to reflect the QoS requirements characteristics of each traffic in a multi-tiered heterogeneous network environment, resulting in deterioration of network reliability and efficiency.

SUMMARY OF THE INVENTION

Accordingly, the embodiments of the present invention substantially obviate one or more problems due to limitations and disadvantages of the related art.

An aspect is to provide QoS in a multi-tiered heterogeneous network environment. Specifically, to ensure QoS, the example embodiments may control traffic by considering traffic QoS requirements characteristics at the upper layer and routing path characteristics per network slice at the lower layer.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

According to an aspect, there is provided a traffic control method including identifying a traffic session based on QoS characteristics information of a transport layer, generating transmission state information of the traffic session by performing analysis on the traffic session, and generating path state information of the traffic session based on QoS requirements information of the traffic session and routing cost information of a network layer, determining whether the transmission state information and the path state information satisfy a QoS traffic policy, and performing traffic control according to a result of the determination.

The QoS traffic policy according to example embodiments may include a QoS traffic policy for each service type, and determining may determine whether the transmission state information and the path state information satisfy the QoS traffic policy corresponding to a service type of the traffic session.

The transmission state information according to example embodiments may include metadata regarding at least one of traffic sent, shaping drop rate, traffic received, weighted moving average based throughput, packet size, cumulative number of transmitted and received packets, latency, and routing count for the traffic session.

Generating according to example embodiments may include calculating reliability, promptness, stability, and transmission capacity of a network slice that is a path for the traffic session based on the routing cost information, and determining the path state information by applying a weight to each of the reliability, promptness, stability, and transmission capacity based on the QoS requirements information of the traffic session.

Performing according to example embodiments may include performing, if the QoS traffic policy is not satisfied as a result of the determination, at least one of window size control, dynamic queue control, and commit rate control.

Further, performing according to example embodiments may include performing at least one of window size control, dynamic queue control, and commit rate control in accordance with a preset priority.

Furthermore, the traffic control method may further include re-discovering a routing path, if the transmission state information and the path state information of the traffic session identified after performing the at least one do not satisfy the QoS traffic policy.

According to another aspect, there is provided an electronic apparatus including a memory having at least one program stored thereon, and a processor configured to, by executing the at least one program, identify a traffic session based on QoS characteristics information of a transport layer, generate transmission state information of the traffic session by performing analysis on the traffic session, and generate path state information of the traffic session based on QoS requirements information of the traffic session and routing cost information of a network layer, determine whether the transmission state information and the path state information satisfy a QoS traffic policy, and perform traffic control according to a result of the determination.

Further, the electronic apparatus according to example embodiments may perform traffic control in a multi-tiered heterogeneous network environment including terrestrial, aerial, and satellite links.

According to yet another aspect, there is provided a non-transitory computer-readable recording medium having a program for executing the above-described traffic control method in a computer recorded thereon.

Additional aspects of example embodiments will be set forth in part in the description which follows and, in part, will be apparent from the description, or may be learned by practice of the disclosure.

The traffic control method and apparatus according to example embodiments may effectively ensure data QoS in a multi-tiered heterogeneous network environment by controlling traffic by comprehensively considering end-to-end network conditions in conjunction with traffic QoS characteristics at the transport layer and routing information at the network layer.

The traffic control method and apparatus according to example embodiments calculate cost function values of network slice reliability, promptness, stability, and transmission capacity to recognize end-to-end network conditions in conjunction with routing information at the network layer, and apply weighted values of traffic QoS requirements to the calculated values to reflect different end-to-end multi-tiered heterogeneous network conditions on a link-by-link basis, thereby improving network efficiency and slice end-to-end service quality.

The traffic control method and apparatus according to example embodiments may identify which of one or more service types is optimal for communication by determining whether a service type of the traffic session satisfies a corresponding QoS traffic policy.

The effects of the present disclosure are not limited to the effects mentioned above, and other effects not mentioned will be clearly understood by those skilled in the art from the following description.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 4 illustrates examples of traffic QoS characteristics at the transport layer and slice characteristics at the network layer, according to example embodiments;

With respect to the description of the drawings, the same or similar reference numerals may be used for the same or similar components.

DETAILED DESCRIPTION

In the following, with reference to the accompanying drawings, example embodiments of the present disclosure will be described in detail so that those of skill in the art to which the present disclosure pertains may easily implement them. Reference will now be made in detail to the embodiments of the present invention, examples of which are illustrated in the accompanying drawings.

Throughout the specification, a "traffic session" or "flow" as referred to herein may refer to an end-to-end connection of communications, and may be defined as a set of packets with common attributes that pass through an observation point over a period of time.

Next-generation 6G network technologies are being researched based on network construction in conjunction with multi-tiered heterogeneous communication resources in the existing ground-centered single-tiered mobile communication network environment. Therefore, ensuring data QoS in a multi-tiered heterogeneous network environment is expected to be a key factor that determines the success of next-generation 6G network technology.

Figure 1:
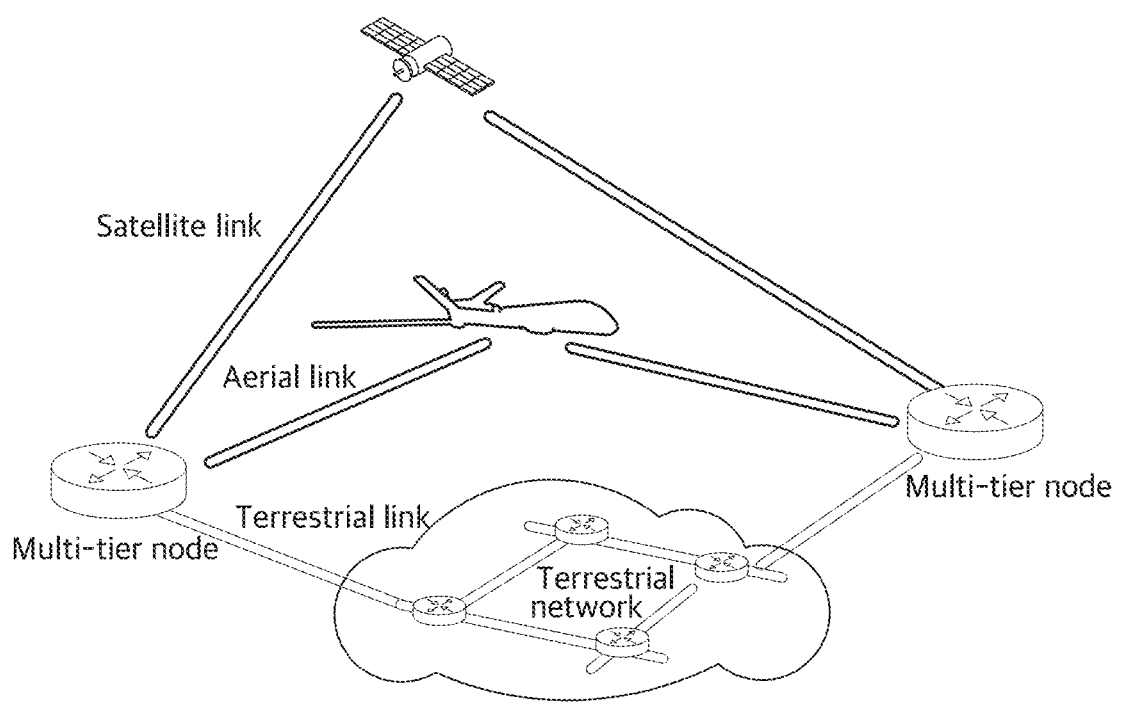
FIG. 1 illustrates a network structure constituting multi-tier links of heterogeneous terrestrial, aerial, and satellite links with multi-tier nodes according to example embodiments.

FIG. 1 illustrates a network structure constituting multi-tier links of heterogeneous terrestrial, aerial, and satellite links with multi-tier nodes according to example embodiments.

A multi-tier node essentially acts as a router providing network paths, and provides routing paths according to the network topology and cost function.

Figure 2:
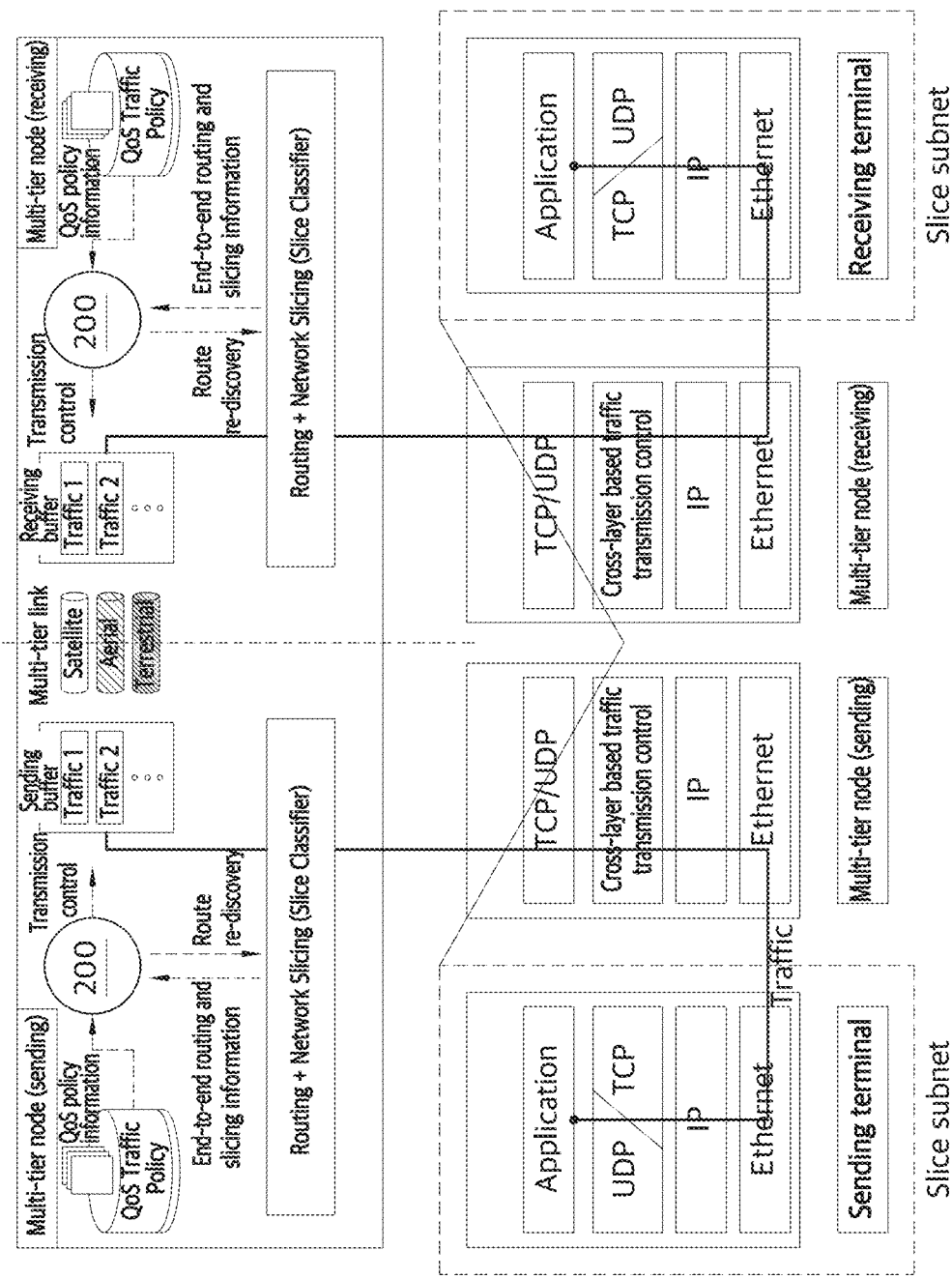
FIG. 2 illustrates an electronic apparatus according to example embodiments performing traffic control.

FIG. 2 illustrates an electronic apparatus according to example embodiments performing traffic control.

Since a multi-tiered heterogeneous network environment is a network in which a dynamic wireless topology is organized over heterogeneous links in space, in the air, and on the ground, network path changes are frequent and transmission capacity and quality are different for each wireless link. Therefore, consideration of traffic QoS requirements and network slice characteristics for each multi-tier link is necessary to effectively ensure data QoS in a multi-tiered heterogeneous network environment.

Accordingly, the electronic apparatus 200 of FIG. 2 may control traffic by considering QoS characteristics information of the upper transport layer (e.g., TCP/UDP) and network slice-specific routing cost information of the lower network layer (e.g., IP) in a network environment comprising network slices on physical multi-tier heterogeneous links in space (satellite link), air (aerial link), and ground (terrestrial link).

The electronic apparatus 200 of FIG. 2 may be a multi-tier node, may be included in a multi-tier node, may include a Multi-tier QoS-Traffic Control Engine (MQ-TCE), may correspond to an MQ-TCE, or may be included in an MQ-TCE. Referring to FIG. 2, upon input of a traffic session generated by an application on a sending terminal on the sending side of a multi-tier node, the electronic apparatus 200 identifies the traffic session based on QoS characteristics information from the upper transport layer (e.g., TCP/UDP). The traffic session (e.g., a set of traffic1, traffic2, etc.) may be temporarily stored in a sending buffer. The electronic apparatus 200 identifies the traffic session and performs analysis on the traffic session to generate "transmission state information" per IP flow. The electronic apparatus 200 generates "path state information" per IP flow based on the QoS requirements information of the traffic session and end-to-end routing and slicing information (e.g., routing cost information) of the network layer (e.g., IP). As a result, the electronic apparatus 200 maps a network slice ID (e.g., to satellite, aerial, and terrestrial links) in response to the transmission state information for determining whether the QoS is satisfied and the path state information for determining the path state per slicing satisfying a QoS traffic policy, or controls traffic transmission or re-discovers a routing path in response to not satisfying the QoS traffic policy. In other words, the electronic apparatus 200 may perform layer-crossing based traffic transmission control of the upper transport layer and the lower network layer.

Referring to FIG. 2, the electronic apparatus 200 may perform the aforementioned functions on the receiving side corresponding to the sending side as well as on the sending side.

Figure 3:
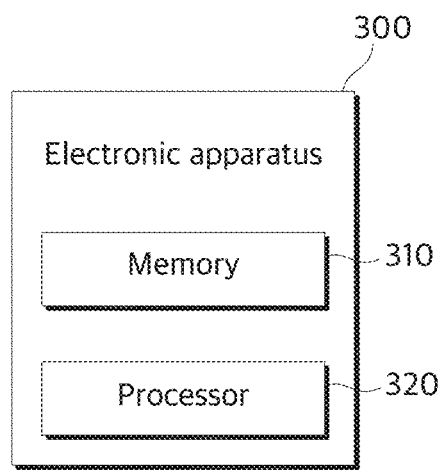
FIG. 3 is a block diagram illustrating an electronic apparatus according to example embodiments.

FIG. 3 illustrates an electronic apparatus 300 according to example embodiments.

The electronic apparatus 300 includes a memory 310 and a processor 320. Only components relevant to the example embodiments are shown in the electronic apparatus 300 illustrated in FIG. 3. Accordingly, it will be apparent to those skilled in the art that the electronic apparatus 300 may include other general purpose components in addition to those shown.

The electronic apparatus 300 according to example embodiments may directly identify one or more network traffic sessions and may determine whether the transmission state information of the identified one or more network traffic sessions and the path state information of the traffic sessions based on the routing cost information of the network layer satisfy a QoS traffic policy to control the traffic. Thus, the electronic apparatus 300 may operate in a distributed environment without a centralized management element and may efficiently control data traffic transmission in a multi-tiered heterogeneous network.

The memory 310 is hardware that stores various data processed within the electronic apparatus 300. The memory 310 may store data that has been processed and data that is to be processed by the electronic apparatus 300. The memory 310 may also store applications, drivers, and the like to be driven by the electronic apparatus 300. The memory 310 may include random access memory (RAM), such as dynamic random access memory (DRAM), static random access memory (SRAM), or the like: read-only memory (ROM): electrically erasable programmable read-only memory (EEPROM): CD-ROM, Blu-ray, or other optical disk storage: hard disk drive (HDD): solid state drive (SSD); flash memory: or other non-transitory computer-readable recording medium.

To control traffic, the processor 320 may perform a determination of whether the transmission state information of the traffic session and the path state information of the traffic session satisfy a QoS traffic policy. For example, the processor 320 may execute instructions and relevant programs stored in the memory 310 within the electronic apparatus 300 to provide overall control of the electronic apparatus 300. The processor 320 may be implemented as a central processing unit (CPU), graphics processing unit (GPU), application processor (AP), or the like within the electronic apparatus 300, but is not limited thereto.

According to example embodiments, the processor 320 may, by executing at least one program stored in the memory 310, identify a traffic session based on QoS characteristics information of the transport layer, generate transmission state information of the traffic session by performing analysis on the traffic session, generate path state information of the traffic session based on QOS requirements information of the traffic session and routing cost information of the network layer, determine whether the transmission state information and the path state information satisfy a QoS traffic policy, and perform traffic control according to the determination result.

The processor 320 according to example embodiments may control traffic by determining whether the transmission state information and path state information of the one or more traffic sessions satisfy a QoS traffic policy. The QoS traffic policy may be preset and stored in the memory 310. The QoS traffic policy may include at least one of items corresponding to traffic QoS information (e.g., delay, loss, throughput, priority, protocol, session information, session time, termination condition, session characteristics, differentiated service code point (DSCP), etc.) and items corresponding to each network slice characteristic (e.g., reliability, promptness, stability, transmission capacity, etc.). Here, the QoS traffic policy may be set for each service type. For example, the service type may include at least one of voice, video, multimedia, or file transfer services (e.g., FTP, etc.).

According to example embodiments, when the processor 320 determines whether the transmission state information and path state information of a traffic session satisfy a QoS traffic policy, the processor 320 may determine whether the transmission state information and path state information satisfy a QoS traffic policy corresponding to the service type of the traffic session. For example, the processor 320 may determine that the transmission state information and path state information satisfy all of the QoS traffic policies corresponding to the voice service of the traffic session (e.g., delay less than 5 ms and loss less than 10%, etc.), but do not satisfy all of the QoS traffic policies corresponding to the video service of the traffic session (e.g., delay less than 1 ms and loss less than 1%, etc.).

According to example embodiments, the transmission state information for the traffic session generated by the processor 320 performing analysis on the traffic session may include metadata regarding at least one of traffic sent, shaping drop rate, traffic received, weighted moving average based throughput, packet size, cumulative number of transmitted and received packets, delay, and routing count for the traffic session, and each piece of the transmission state information may be average or maximum-minimum information regarding each piece of the information. For example, the transmission state information may include at least one of average traffic sent, maximum-minimum traffic sent, average shaping drop rate, and maximum-minimum shaping drop rate.

According to example embodiments, when the processor 320 generates the transmission state information of the traffic session and the path state information of the traffic session, the processor 320 may calculate the reliability, promptness, stability, and transmission capacity of the network slice that is the path of the traffic session based on the routing cost information, and determine the path state information by applying a weight to each of the calculated reliability, promptness, stability, and transmission capacity based on the QoS requirements information of the traffic session. Further, when the processor 320 generates the path state information, it may take a weighted sum of each of the reliability, promptness, stability, and transmission capacity, or analyze the weighted sum using normalization (e.g., using an Analytic Hierarchy Process (AHP) or the like). As a result, the processor 320 may determine whether a QoS traffic policy is satisfied by comparing the generated final path state information value to a corresponding reference value in the QoS traffic policy. For example, if the weights based on the traffic QoS requirements information are 2:1:1:2, the reliability, promptness, stability, and transmission capacity are 0.5,1,1,1,0.5, respectively, and the corresponding QoS traffic policy reference value is 5 or more, the weighted sum is 2*0.5+1*1+1*1+0.5*2=4, so the processor 320 may determine that the transmission state information and the path state information do not satisfy the QoS traffic policy.

According to example embodiments, if the transmission state information of the traffic session and the path state information of the traffic session satisfy the QoS traffic policy, the processor 320 may map a network slice ID to determine which network slice the traffic traverses.

According to example embodiments, when the processor 320 generates the transmission state information and path state information of the traffic session, if the processor 320 determines that the transmission state information and path state information of the traffic session do not satisfy the QoS policy, the processor 320 may perform at least one of window size control, dynamic queue control, and commit rate control. According to an example embodiment, the processor 320 may perform the window size control, dynamic queue control, and commit rate control according to a preset priority. For example, the window size control, dynamic queue control, and commit rate control may be set to a first priority, a second priority, and a third priority, respectively, in that order.

The window size control, which may be set as the first priority by the processor 320, is a case where the traffic session being acknowledged is TCP and operates by adjusting the window size of a received ACK at an application on the sending terminal. The window size control operated by the processor 320 operates in a manner of reducing the amount of traffic generated by the source of the traffic (e.g., the application on the sending terminal), which may have the effect of minimizing losses generated in the network. In the case of general TCP flow control, the amount of traffic sent by the sending node may be controlled through the window size information of the ACK, but this has the problem that it can only work when a situation such as ACK loss or NAK occurs. In particular, in multi-tiered heterogeneous networks, the latency and loss rate vary depending on the link characteristics, so it is difficult to adjust the appropriate data transmission capacity with general flow control algorithms. To address these issues, the present disclosure enables the processor 320 to analyze the transmission state of the TCP traffic and the traffic on the routing path through the transmission state information and the path state information of the traffic session to adjust the window size suitable for the end-to-end path. For example, the processor 320 may utilize a bandwidth value from the path state information of the traffic session to resize the window to fit the end-to-end path state (e.g., to 30% of the bandwidth).

The dynamic queue control, which may be set as the second priority in the processor 320, may be applied to both TCP and UDP. The dynamic queue control operated by the processor 320 may have the effect of minimizing the loss of high priority packets through the parameters of the queue, even when traffic loss occurs. Typically, traffic is assigned to a buffer, such as a weighted fair queue (WFQ), based on the DSCP marking value of the traffic, and the processor 320 performs prioritized transmissions and queue drops when scheduling packet transmissions of the router. The dynamic queue control operated by the processor 320 controls the priority and queue size of WFQs based on network conditions to minimize the loss of high priority packets.

The commit rate control, which may be set as the third priority in the processor 320, may operate in a shaping or policing manner that directly controls the commit rate of an interface. The commit rate control may be set to a later priority because some packets may be lost based on the allowable interface bandwidth when the processor 320 controls traffic with the commit rate control via shaping or policing.

According to example embodiments, if the processor 320 determines that the transmission state information and path state information of the traffic session determined by processor 320 after performing at least one of the window size control, dynamic queue control, and commit rate control still do not satisfy the QoS traffic policy, the processor 320 may re-discover a routing path. Because the routing cost information changes when the processor 320 re-discovers a routing path, the processor 320 may regenerate the path state information of the traffic session based on the changed routing cost information.

FIG. 4 illustrates examples of traffic QoS characteristics of a transport layer and characteristics of a network layer in detail, according to example embodiments.

The transport layer traffic QOS characteristics may include items regarding at least one of protocol, session information, session time, termination condition, session characteristics, DSCP, priority, and required throughput. Specifically, the protocol item may identify information about TCP, UDP, and port: the session information item may identify information about message size, cycle, and retransmissions: the session time item may identify information about Long, Middle, and Short: the termination condition item may identify information about latency and transmission success rate: the session characteristics item may identify real-time, quasi-real-time, and non-real-time, the DSCP item may identify EF, AF11, AF22, etc.; the priority item may identify high, medium, and low; and the required throughput item may identify whether it is a certain value of Mbps or more.

The network layer characteristics may include items regarding at least one of reliability (Rsid), promptness (Psid), stability (Ssid), and transmission capacity (Csid) of a network slice.

The slice reliability (Rsid) is the baseline for per-slice transmission success rate, and the slice cost function may be calculated through Equation 1 below.

$$R_{s_{id}} = \text{Slice\_ETX}_{s_{id}} = \sum_i (ETX_{s_i}) = \sum_i \left( \gamma_{s_{id}} \times \frac{1}{(1 - avg \cdot D_{f_{s_i}})(1 - avg \cdot D_{r_{s_i}})} \right) \quad \text{[Equation 1]}$$

Slice_ETX$_{s_{id}}$, which means the expected transmission count per slice, means the sum of ETX$_{s_i}$ of slices $s_{id}$ per link i obtained from the routing information. ETX$_{a_i}$ is calculated as a value from the average forward error rate avg. D$_{f_{si}}$ and average reverse error rate avg. D$_{r_{si}}$ of link i, and the intrinsic error characteristic value $\gamma_{s_{id}}$ for each slice of multi-tiered heterogeneous network.

The slice promptness (Psid) is the baseline for per-slice delay factor, and the slice cost function may be calculated through Equation 2 below.

$$P_{s_{id}} = \text{Slice\_ETT}_{s_{id}} = \sum_i \left( avg \cdot ETT_{s_{id}} \times \frac{S}{\min \cdot BW_{s_{id}}} \right) = \sum_i \left( \delta_{s_{id}} \times \frac{1}{(1 - avg \cdot D_{f_{s_i}})(1 - avg \cdot D_{r_{s_i}})} \times \frac{S}{\min \cdot BW_{s_{id}}} \right) \quad \text{[Equation 2]}$$

Slice_ETT$_{s_{id}}$, which means the expected transmission time per slice, is calculated by multiplying the average expected transmission time avg. ETT$_{s_{id}}$ of link i obtained from the routing information by the result of dividing the size of the traffic S by the minimum bandwidth min. BW$_{s_{id}}$ of the slice s$_{id}$. The average expected transmission time avg. ETT$_{s_{id}}$ is calculated as a value from the average forward error rate avg. D$_{f_{si}}$ and average reverse error rate avg. D. of link i and the intrinsic delay characteristic value δ$_{s_{id}}$ for each slice of multi-tiered heterogeneous network.

The slice stability (Ssid) is the baseline for per-slice route stability, and the slice cost function may be calculated through Equation 3 below.

$$S_{s_{id}} = \text{Slice\_RUC}_{s_{id}} = \sum_{i}\left(avg \cdot RUC_{s_i}(t)\right) \quad \text{[Equation 3]}$$

Slice_RUC$_{s_{id}}$, which means the route stability per slice, is calculated through the sum of the average routing update count ang. RUC$_{s_i}$, which means the average routing update counter (RUC) of link i obtained from the routing information of the slice s$_{id}$. The average routing update count is calculated as the value of the average number of routing updates changed in a certain period of time t.

The slice transmission capacity (Csid) is the baseline for per-slice transmittable capacity, and the slice cost function may be calculated through Equation 4 below.

$$C_{s_{id}} = \text{Slice\_CAP}_{s_{id}} = \alpha \times \min \cdot BW_{s_{id}} \quad \text{[Equation 4]}$$

$$\alpha * \text{flow}_{s_{id}} \geq \sum_{i}^{N} ABR_N$$

Slice_CAP$_{s_{id}}$, which means the transmission capacity per slice, is calculated as the product of the minimum bandwidth (min. BW$_{s_{id}}$) obtained from the routing information of the slice s$_{id}$ and the allowable interface capacity (α) per slice. However, the allowable interface capacity per slice must satisfy the condition α<1. Further, flow$_{s_{id}}$ Further, means the traffic flow per slice s$_{id}$, and ABR$_N$ means the Nth average bit rate (ABR).

As a result, an electronic apparatus or processor according to example embodiments may be aware of a network environment for an end-to-end path through slice cost functions of a multi-tiered network.

The QOS traffic policy is provided to the electronic apparatus in the form of a database, via network planning, of QoS requirements information corresponding to the traffic QoS characteristics of the transport layer and the slice characteristics items of the network layer of FIG. 4 identified in the traffic session. Since more than one traffic may be transmitted through the electronic apparatus within a traffic session, a respective QoS traffic policy may be defined for each individual traffic.

Figure 5:
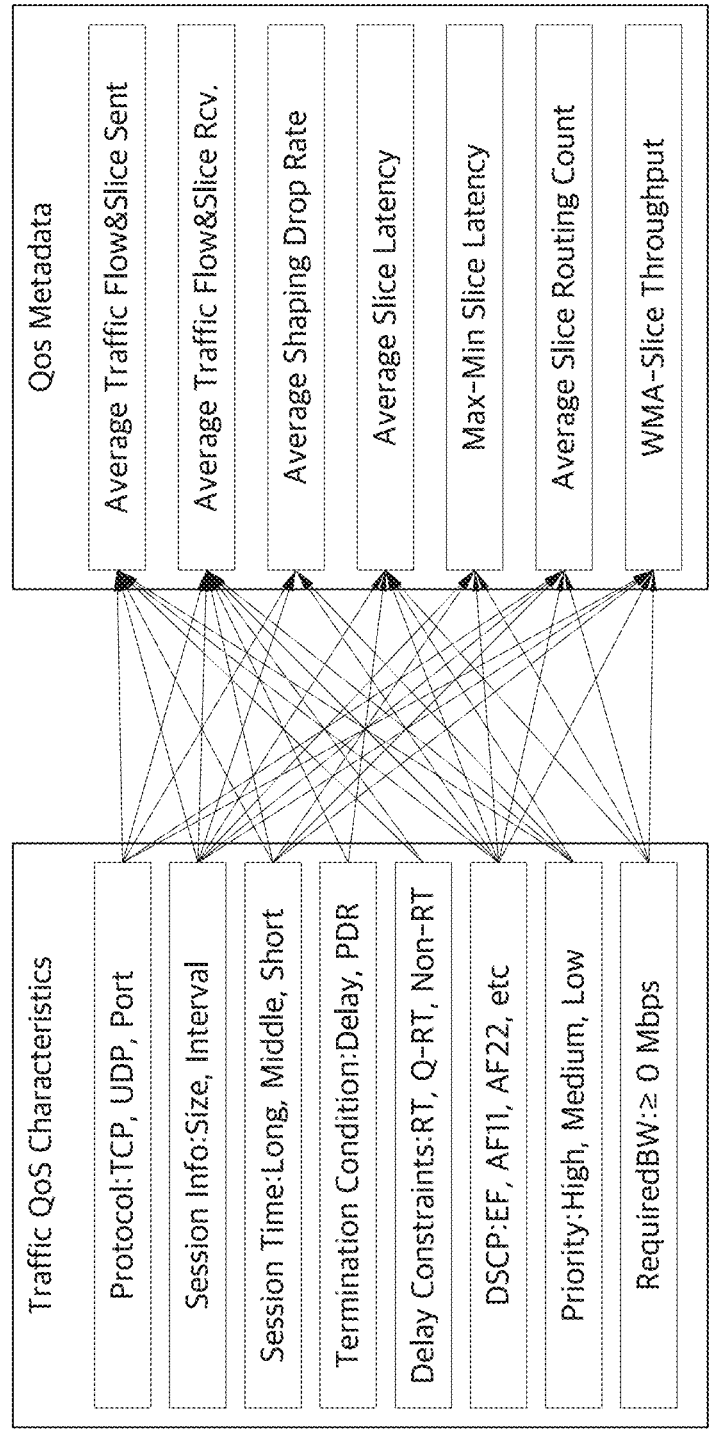
FIG. 5 illustrates examples of metadata generated based on traffic QoS characteristics information, according to example embodiments.

FIG. 5 illustrates examples of metadata generated based on traffic QoS characteristics information in an electronic apparatus according to example embodiments.

According to example embodiments, the electronic apparatus may identify a traffic session based on the QoS characteristics information of the transport layer and perform analysis on the traffic session to generate transmission state information for the traffic session, where the transmission state information may include the metadata of FIG. 5.

As shown in FIG. 5, the metadata is generated based on the traffic QoS characteristics information. Generating the metadata means generating the processed label data required to perform an analysis of the traffic session by targeting the packet flow identified from the traffic session information. The QoS characteristics information of each traffic required for metadata generation is connected by solid lines in FIG. 5. For example, the weighted moving average based throughput data of a traffic session may be generated based on information about the protocol, session information, session time, delay limit, DSCP, and required bandwidth, among other QoS characteristics of the traffic.

According to example embodiments, the metadata may include at least one of traffic sent, shaping drop rate, traffic received, weighted moving average based throughput, packet size, cumulative number of packets sent and received, delay, and routing count. Each metadata may be an average or maximum and minimum data for respective metadata. For example, the metadata may include average traffic sent, average traffic received, average shaping drop rate, average delay, maximum-minimum delay, and average routing count.

Figure 6:
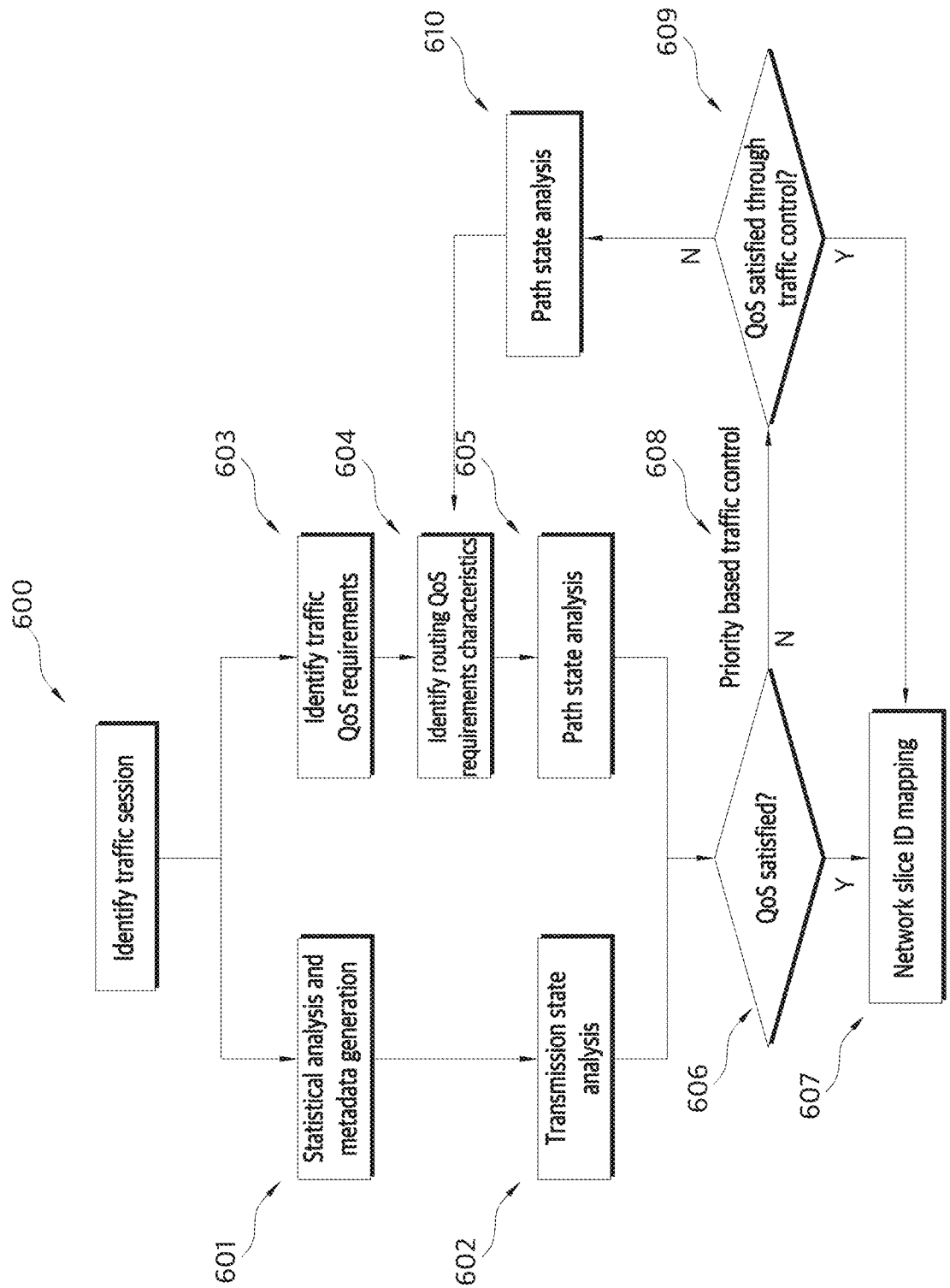
FIG. 6 is a flowchart illustrating a method of performing traffic control by an electronic apparatus according to example embodiments.

FIG. 6 is a flowchart illustrating a method of performing traffic control by an electronic apparatus according to example embodiments.

Some or all of the operations according to example embodiments shown in FIG. 6 may be performed by the electronic apparatus or processor of FIG. 2 or 3. FIG. 6 illustrates an example of a traffic control method for an electronic apparatus to efficiently control traffic by comprehensively considering end-to-end network conditions.

An electronic apparatus according to example embodiments may perform at least one of operations 600 to 610 shown in FIG. 6.

Referring to operation 600, the electronic apparatus according to example embodiments may identify a traffic session generated from an application at a sending end based on transport layer QoS characteristics information. For example, identifying the traffic session based on the transport layer QoS characteristics information may mean extracting information corresponding to the traffic QoS characteristics of FIG. 4 from the information of the traffic session. The QoS characteristics information may mean, for example, some or all of the traffic QoS characteristics items of FIG. 4.

Referring to operation 601, the electronic apparatus may perform an analysis on the identified traffic session to generate metadata of the traffic session. The metadata of the traffic session may include metadata regarding at least one of the traffic sent, shaping drop rate, traffic received, weighted moving average based throughput, packet size, cumulative number of transmitted and received packets, delay, and routing count shown in FIG. 5.

Referring to operation 602, the electronic apparatus may generate per-IP flow transmission state information based on the generation of metadata for the traffic session. The transmission state information may be, for example, information that the metadata generated in operation 601 is sampled according to a predetermined cycle.

Referring to operation 603, the electronic apparatus may identify QoS requirements information of the identified traffic session. The QoS requirements information of the traffic session may correspond to a weighted value for each of the reliability, promptness, stability, and transmission capacity of the network slice of FIG. 4, for example.

Referring to operation 604, the electronic apparatus may determine routing QoS requirements characteristics. The routing QoS requirements characteristics may be the reliability, promptness, stability, and transmission capacity of the network slice shown in FIG. 4. The reliability, promptness, stability, and transmission capacity of the network slice may be calculated according to the respective slice cost functions described above based on the routing cost information.

Referring to operation 605, the electronic apparatus may generate path state information per IP flow based on the QoS requirements information of the traffic session and the routing cost information. The path state information may be determined by applying a weight to each of the reliability, promptness, stability, and transmission capacity based on the QoS requirements information of the traffic session. Further, the path state information may be determined by the weighted sum of each routing QoS requirements characteristic (reliability, promptness, stability, or transmission capacity) with the QoS requirements information of each traffic session, or by analyzing the weighted sum using normalization (e.g., using Analytic Hierarchy Process (AHP)).

Referring to operation 606, as a result, the electronic apparatus may determine whether the transmission state information generated to determine the QoS satisfaction state of the traffic session and the path state information generated to determine the per-slice path state satisfy the QoS traffic policy.

Referring to operation 607, the electronic apparatus may map a network slice ID in response to the transmission state information and path state information satisfying the QoS traffic policy, as a result of determining whether the transmission state information and path state information satisfy the QoS traffic policy.

Referring to operation 608, the electronic apparatus may control traffic according to a preset priority in response to the transmission state information and path state information not satisfying the QoS traffic policy as a result of determining whether the transmission state information and path state information satisfy the QoS traffic policy. The traffic control according to the preset priority may include, for example, window size control, dynamic queue control, and commit rate control, and they may be prioritized as first, second, and third, in that order, respectively.

Referring to operation 609, if the transmission state information and path state information satisfy the QoS traffic policy after the electronic apparatus controls traffic according to the preset priorities, the electronic apparatus may map a network slice ID according to operation 607. If the transmission state information and path state information do not satisfy the QoS traffic policy even after the electronic apparatus controls traffic according to the preset priority, the electronic apparatus may re-discover a routing path, referring to operation 610.

Referring to operation 610, after traffic control according to the preset priority in operation 608, if the QoS traffic policy is not satisfied in operation 609, the electronic apparatus may re-discover a routing path. When the electronic apparatus re-discovers a routing path, the electronic apparatus may recheck the routing QoS requirements characteristics referring to operation 604 since the routing cost information will be different.

Figure 7:
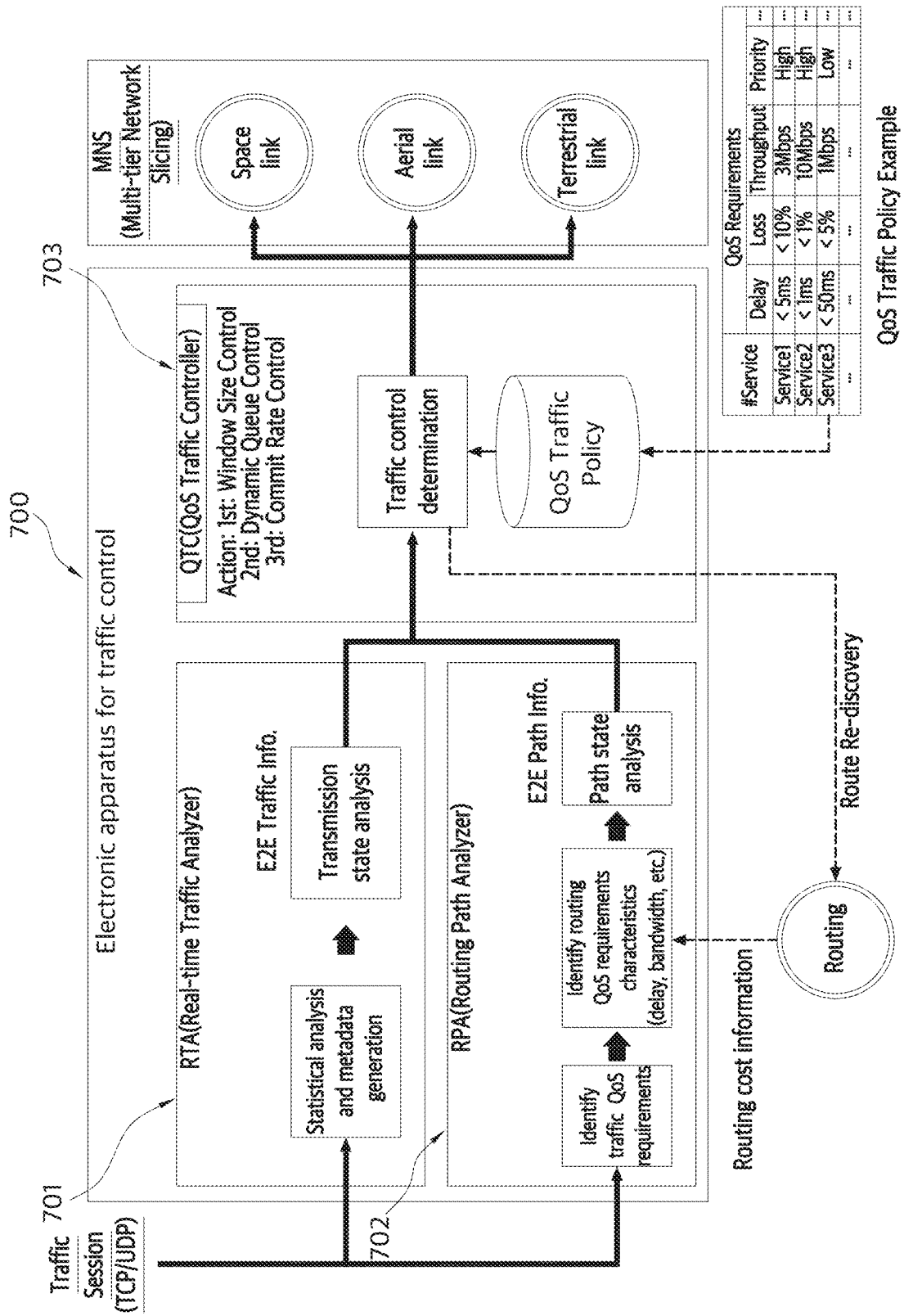
FIG. 7 illustrates a detailed internal operating structure of an electronic apparatus according to example embodiments.

FIG. 7 illustrates a detailed internal operating structure of an electronic apparatus 700, including a real-time traffic analyzer (RTA) 701, a routing path analyzer (RPA) 702, and a QoS traffic controller (QTC) 703, according to example embodiments.

The RTA 701 may generate QoS metadata based on QoS characteristics information of a traffic on the basis of a traffic session based on TCP and UDP, and generate transmission state information per IP flow based on the metadata generated for the traffic session. That is, the RTA 701 is made aware of the transmission state of the end-to-end traffic information from a traffic perspective and forwards the generated transmission state information to the QTC 703.

The RPA 702 may generate path state information per IP flow based on the QoS requirements information of the traffic session and routing cost information. That is, the RPA 702 is made aware of the network environment for the end-to-end path through the cost function for each slice of the multi-tiered network from a path perspective and forwards the generated path state information to the QTC 703.

The QTC 703 receives the transmission state information from the RTA 701 and the path state information from the RPA 702 to determine whether the QoS traffic policy is satisfied, and performs a traffic control decision based on the determination result. The QoS traffic policy of the QTC 703 may include a QoS traffic policy by service type, and may map a network slice ID if the transmission state information and the path state information are determined to satisfy the QoS traffic policy. For example, in FIG. 7, the QTC 703 may map a network slice ID to a space link or an aerial link or a terrestrial link in Multi-tier Network Slicing (MNS). In the QTC 703, as a result of determining whether the transmission state information and path state information satisfy the QoS traffic policy, if the QoS traffic policy is not satisfied, the QTC 703 may perform at least one of window size control, dynamic queue control, and commit rate control according to the preset priority. If the transmission state information and path state information of the traffic session do not satisfy the QoS traffic policy even after the QTC 703 performs at least one of the window size control, dynamic queue control, and commit rate control according to the preset priority, the QTC 703 may re-discover a routing path.

Figure 8:
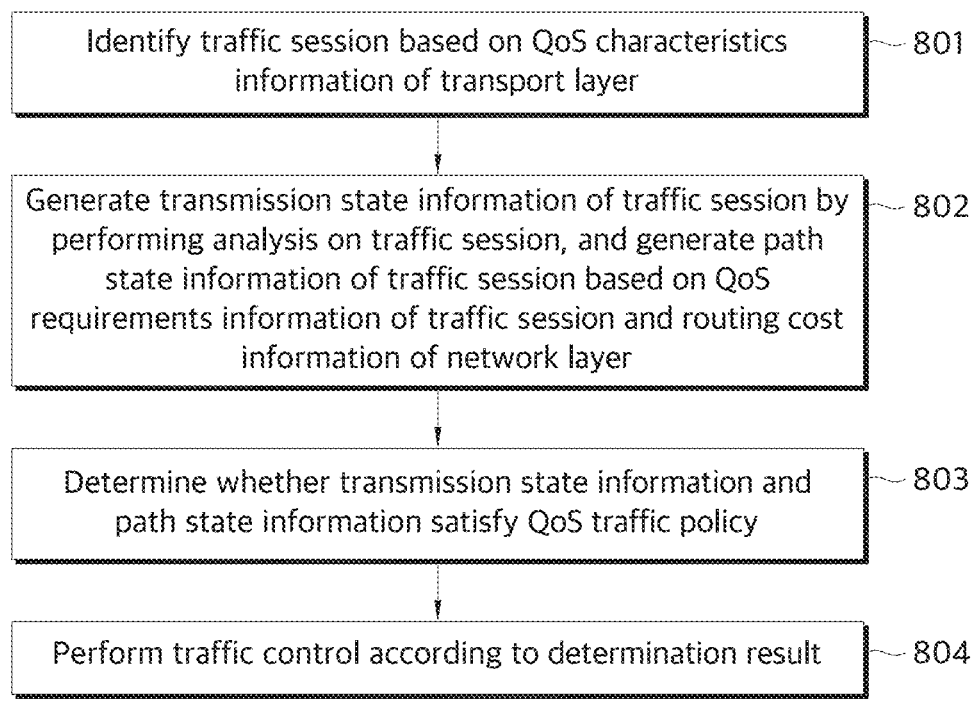
FIG. 8 is a flowchart illustrating another example of a method of performing traffic control by an electronic apparatus according to example embodiments.

FIG. 8 is a flowchart illustrating another example of a method of performing traffic control by an electronic apparatus according to example embodiments.

Some or all of the operations according to example embodiments shown in FIG. 8 may be performed by the electronic apparatus shown in FIGS. 1 through 7.

Referring to operation 801, the electronic apparatus according to example embodiments may identify a traffic session based on QoS characteristics information of the transport layer to perform operation 802. The transport layer QoS characteristics information may be at least one of the items of the traffic QoS characteristics of FIG. 4.

Referring to operation 802, the electronic apparatus according to example embodiments may perform an analysis on the traffic session identified in operation 801 to generate transmission state information of the traffic session, and may generate path state information of the traffic session based on QoS requirements information of the traffic session and routing cost information of the network layer. The transmission state information of the traffic session may include the metadata of FIG. 5 regarding at least one of traffic sent, shaping drop rate, traffic received, weighted moving average based throughput, packet size, cumulative number of transmitted and received packets, delay, and routing count for the traffic session. The path state information may be determined by calculating the slice characteristics items of FIG. 5 regarding at least one of reliability, promptness, stability, and transmission capacity of a network slice that is a path for the traffic session based on the routing cost information, and applying a weight to each of the reliability, promptness, stability, and transmission capacity based on the QoS requirements information of the traffic session.

Referring to operation 803, the electronic apparatus according to example embodiments may determine whether the transmission state information and path state information generated in operation 802 satisfy a QoS traffic policy. Here, the QoS traffic policy may include a QoS traffic policy for each service type, and the electronic apparatus may determine whether the transmission state information and path state information satisfy a QOS traffic policy corresponding to the service type of the traffic session.

Referring to operation 804, the electronic apparatus according to example embodiments may perform traffic control based on the results determined in operation 803. If the QoS traffic policy is not satisfied as a result of the determination in operation 803, the electronic apparatus may perform at least one of traffic controls among window size control, dynamic queue control, and commit rate control in accordance with a preset priority. If the transmission state information and path state information of the traffic session determined after the electronic apparatus performs the at least one traffic control still do not satisfy the QoS traffic policy, the electronic apparatus may re-discover a routing path.

The apparatus according to the above-described example embodiments may include a processor, a memory for storing and executing program data, a permanent storage such as a disk drive, a communication port for communicating with an external device, a user interface device such as a touch panel, a key, a button, or the like. Methods implemented as software modules or algorithms may be stored on a computer-readable recording medium as computer-readable codes or program instructions executable on the processor. Here, the computer-readable recording medium includes a magnetic storage medium (e.g., ROM (read-only memory), RAM (random-access memory), floppy disk, hard disk, etc.) and optical reading medium (e.g., CD-ROM and DVD (Digital Versatile Disc)). The computer-readable recording medium is distributed over networked computer systems, so that computer-readable codes may be stored and executed in a distributed manner. The medium is non-transitory, readable by a computer, stored in a memory, and executed on a processor.

The present example embodiment may be represented by functional block configurations and various processing steps. These functional blocks may be implemented with various numbers of hardware and/or software configurations that perform specific functions. For example, the example embodiment may employ an integrated circuit configuration such as memory, processing, logic, look-up table, or the like, capable of executing various functions by control of one or more microprocessors or other control devices. Similar to that components may be implemented with software programming or software elements, this example embodiment includes various algorithms implemented with a combination of data structures, processes, routines or other programming components and may be implemented with a programming or scripting language including C, C++, Java, assembler, etc. Functional aspects may be implemented with an algorithm running on one or more processors. In addition, the present example embodiment may employ a conventional technique for at least one of electronic environment setting, signal processing, and/or data processing. Terms such as "mechanism", "element", "means", and "configuration" may be used in a broad sense, and are not limited to mechanical and physical configurations. Those terms may include the meaning of a series of routines of software in connection with a processor or the like.

The above-described example embodiments are merely examples, and other example embodiments may be implemented within the scope of the claims to be described later. It will be apparent to those skilled in the art that various modifications and variations can be made in the embodiments of the present invention without departing from the spirit or scope of the invention. Thus, it is intended that the present invention cover the modifications and variations of this invention provided they come within the scope of the appended claims and their equivalents.

What is claimed is:

1. A traffic control method of an electronic apparatus, the traffic control method comprising:

identifying a traffic session based on QoS characteristics information of a transport layer;

generating transmission state information of the traffic session by performing analysis on the traffic session, and generating path state information of the traffic session based on QoS requirements information of the traffic session and routing cost information of a network layer;

determining whether the transmission state information and the path state information satisfy a QoS traffic policy; and performing traffic control according to a result of the determination, wherein generating includes:

calculating reliability, promptness, stability, and transmission capacity of a network slice that is a path for the traffic session based on the routing cost information; and determining the path state information by applying a weight to each of the reliability, promptness, stability, and transmission capacity based on the QoS requirements information of the traffic session.

2. The traffic control method of claim 1, wherein:

the QoS traffic policy includes a QoS traffic policy for each service type; and determining determines whether the transmission state information and the path state information satisfy the QoS traffic policy corresponding to a service type of the traffic session.

3. The traffic control method of claim 1, wherein the transmission state information includes metadata regarding at least one of traffic sent, shaping drop rate, traffic received, weighted moving average based throughput, packet size, cumulative number of transmitted and received packets, latency, and routing count for the traffic session.

4. The traffic control method of claim 1, wherein performing includes performing, if the QoS traffic policy is not satisfied as a result of the determination, at least one of window size control, dynamic queue control, and commit rate control.

5. The traffic control method of claim 4, wherein performing includes performing at least one of the window size control, dynamic queue control, and commit rate control in accordance with a preset priority.

6. The traffic control method of claim 5, further comprising re-discovering a routing path, if the transmission state information and the path state information of the traffic session identified after performing the at least one do not satisfy the QoS traffic policy.

7. An electronic apparatus for traffic control, the electronic apparatus comprising:

a processor; and a memory storing a program for execution by the processor, the program including instructions for:

identifying a traffic session based on QoS characteristics information of a transport layer;
generating transmission state information of the traffic session by performing analysis on the traffic session, and generate path state information of the traffic session based on QoS requirements information of the traffic session and routing cost information of a network layer;
determining whether the transmission state information and the path state information satisfy a QoS traffic policy; and
performing traffic control according to a result of the determination,
wherein generating includes:
calculating reliability, promptness, stability, and transmission capacity of a network slice that is a path for the traffic session based on the routing cost information; and
determining the path state information by applying a weight to each of the reliability, promptness, stability, and transmission capacity based on the QoS requirements information of the traffic session.

8. The electronic apparatus of claim 7, wherein the electronic apparatus performs traffic control in a multi-tiered heterogeneous network environment including terrestrial, aerial, and satellite links.

9. The electronic apparatus of claim 7, wherein:
the QoS traffic policy includes a QoS traffic policy for each service type; and
determining determines whether the transmission state information and the path state information satisfy the QoS traffic policy corresponding to a service type of the traffic session.

10. The electronic apparatus of claim 7, wherein the transmission state information includes metadata regarding at least one of traffic sent, shaping drop rate, traffic received, weighted moving average based throughput, packet size, cumulative number of transmitted and received packets, latency, and routing count for the traffic session.

11. The electronic apparatus of claim 7, wherein performing includes performing, if the QoS traffic policy is not satisfied as a result of the determination, at least one of window size control, dynamic queue control, and commit rate control.

12. The electronic apparatus of claim 11, wherein performing includes performing at least one of the window size control, dynamic queue control, and commit rate control in accordance with a preset priority.

13. The electronic apparatus of claim 12, further comprising re-discovering a routing path, if the transmission state information and the path state information of the traffic session identified after performing the at least one do not satisfy the QoS traffic policy.

14. A non-transitory computer-readable recording medium having a program for executing a traffic control method in a computer recorded thereon, wherein the traffic control method comprising:
identifying a traffic session based on QoS characteristics information of a transport layer;
generating transmission state information of the traffic session by performing analysis on the traffic session, and generating path state information of the traffic session based on QoS requirements information of the traffic session and routing cost information of a network layer;
determining whether the transmission state information and the path state information satisfy a QoS traffic policy; and
performing traffic control according to a result of the determination,
wherein generating includes:
calculating reliability, promptness, stability, and transmission capacity of a network slice that is a path for the traffic session based on the routing cost information; and
determining the path state information by applying a weight to each of the reliability, promptness, stability, and transmission capacity based on the QoS requirements information of the traffic session.

15. The non-transitory computer-readable recording medium claim 14, wherein the electronic apparatus performs traffic control in a multi-tiered heterogeneous network environment including terrestrial, aerial, and satellite links.

16. The non-transitory computer-readable recording medium claim 14, wherein:
the QoS traffic policy includes a QoS traffic policy for each service type; and
determining determines whether the transmission state information and the path state information satisfy the QoS traffic policy corresponding to a service type of the traffic session.

17. The non-transitory computer-readable recording medium claim 14, wherein the transmission state information includes metadata regarding at least one of traffic sent, shaping drop rate, traffic received, weighted moving average based throughput, packet size, cumulative number of transmitted and received packets, latency, and routing count for the traffic session.

* * * * *